March 28, 1944.   W. M. BRADSHAW   2,345,028
MEASURING INSTRUMENT
Filed July 10, 1941
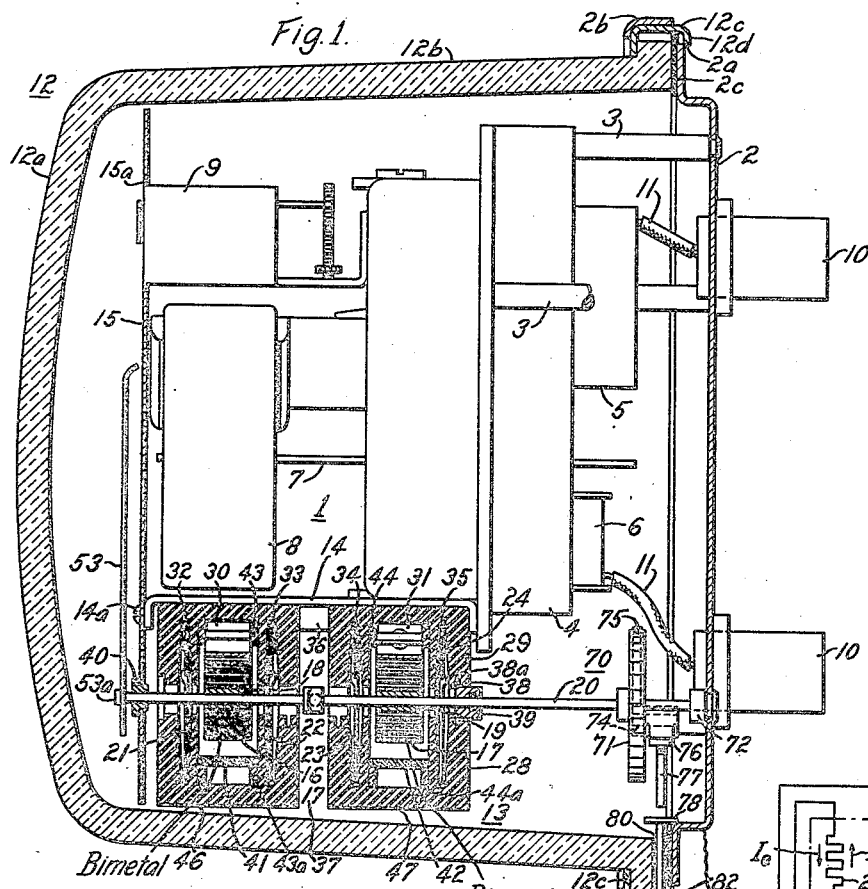
INVENTOR
William M. Bradshaw.
BY
ATTORNEY Patented Mar. 28, 1944

2,345,028

UNITED STATES PATENT OFFICE 2,345,028

MEASURING INSTRUMENT

William M. Bradshaw, Summit, N. J., assignor to Westinghouse Electric & Manufacturing Company, East Pittsburgh, Pa., a corporation of Pennsylvania Application July 10, 1941, Serial No. 401,718

4 Claims. (Cl. 171—34)

This invention relates to measuring instruments and it has particular relation to instruments for measuring the maximum demand of variable electrical quantities.

In order to provide a proper basis for rate structures, it is common practice to employ maximum demand instruments for measuring the maximum demand of a variable quantity such as electrical current, energy or volt amperes. Generally, it is undesirable to provide an indication of the instantaneous maximum demand of the quantity. For this reason, it is common practice to measure the maximum demand over a predetermined demand interval, such as 15 minutes.

In the maximum demand measuring devices heretofore employed, a pusher arm is provided which is moved in accordance with the quantity to be measured. In its movement, the pusher arm engages a maximum demand indicator, such as a pointer or pen, and moves the indicator to a position corresponding to the maximum demand for the desired interval. Should a larger value of maximum demand occur during a succeeding interval, the pusher arm again engages the indicator and moves it into a position corresponding to the larger value.

With the prior art construction, a plurality of parts are required which contribute to the complexity and cost of the maximum demand measuring device. For example, the maximum demand indicator may include a pointer mounted on a stub shaft. This pointer also requires a friction device or ratchet mechanism for holding the pointer in any position to which it is actuated by the pusher arm.

At the end of a billing period, such as one month, it is customary to reset the maximum demand indicator. Because of the position of the parts in the prior art structures, the resetting mechanism conventionally is placed adjacent the viewing face of the instrument. Such a position interferes with the visibility of the scales associated with the maximum demand measuring device and may require an intricate construction.

The pusher arm in the prior art maximum demand measuring device is actuated for each variation in the variable quantity being measured, whether or not such variation affects the position of the maximum demand indicator. Such continued movement of the pusher arm and parts employed for its actuation results in substantial wear.

In accordance with this invention, a demand measuring device is provided with unidirectional means for holding the device in any extreme position to which it is deflected. In a specific embodiment of the invention, a thermomotive unit such as that represented by a bimetallic spring is permitted to deflect only in the direction corresponding to an increase in the demand being measured. Consequently, a variation in demand which does not exceed a preceding value fails to deflect the bimetallic spring and pusher arm. The pusher arm preferably is modified to provide an indication of the deflection of the bimetallic spring. To this end, the pusher arm may be formed as an indicating pointer or as a pen arm. Such a construction dispenses with the requirement for a separate indicating pointer or pen arm.

In accordance with a further aspect of the invention, the maximum demand measuring device is associated with a suitable measuring instrumentality, such as a watthour meter in a common casing or enclosure. The conventional enclosure employed for such devices includes a base member and a cup-shaped cover member associated therewith. Preferably, the maximum demand indicating means is positioned adjacent the front of the cover and the unidirectional control means is positioned adjacent the base member of the enclosure. With such a positioning of the parts, resetting mechanism for permitting reverse rotation of the bimetallic spring may have an externally operable control member extending through the enclosure adjacent the junction between the cover and base members. In this position, the resetting mechanism does not interfere with the visibility of pointers and scales adjacent the front of the cover. Furthermore, the position does not require excessive modification of the enclosure to permit passage of the control member.

It is, therefore, an object of the invention to provide an improved demand measuring device.

It is a further object of the invention to provide a demand measuring device having an actuating element free to move only in a predetermined direction.

It is another object of the invention to provide a demand measuring device having an actuating element free to move only in a predetermined direction and having resetting means operable for permitting reverse movement of the actuating means.

It is a still further object of the invention to provide a thermal maximum demand measuring device having bimetallic actuating means free to deflect only in a predetermined direction.

It is a still further object of the invention to provide a thermal maximum demand measuring device having bimetallic actuating means free to deflect only in a predetermined direction and having resetting means operable for permitting reverse deflection of the bimetallic actuating means.

It is a still further object of the invention to provide a maximum demand measuring device associated with a measuring instrument in a common enclosure wherein indicating means for the maximum demand device is positioned adjacent the front of the enclosure and unidirectional means for restricting movement of the actuating means employed in the maximum demand measuring device is positioned adjacent the rear of the enclosure.

It is another object of the invention to provide a watthour meter, having a base member and a cup-shaped cover member forming an enclosure, with a thermal maximum demand measuring device having indicating means extending over the front of the watthour meter and having resetting means including an externally operable control member extending through the enclosure adjacent the junction between the cover and base members.

Other objects of the invention will be apparent from the following description taken in connection with the accompanying drawing, in which:

Figure 1 is a sectional view in side elevation of a measuring instrumentality embodying the invention;

Fig. 2 is a view in front elevation with parts broken away of the instrumentality shown in Fig. 1; and Fig. 3 is a schematic view showing electrical connections for the instrumentality of Fig. 1.

Referring to the drawing, Fig. 1 shows a measuring instrument, such as an alternating-current watthour meter 1, attached to a base plate 2 by means of suitable pillars 3. The watthour meter may be of generally conventional construction, including an electromagnet 4 having a voltage winding 5 and current windings 6 which cooperate when energized to produce a shifting magnetic field. An electroconductive armature or disc 7 is positioned for rotation in the field produced by the voltage and current windings. Rotation of the armature 7 is retarded by a braking magnet 8. A conventional register 9 may be associated with the armature 7 for integrating the rotation thereof. Preferably, the register is detachably associated with the watthour meter 1, a suitable construction for this purpose being shown in the Miller et al. Patent No. 1,598,489.

The casing for the watthour meter 1 may vary appreciably in construction. In the specific embodiment illustrated in Fig. 1, the casing is designed to provide a detachable watthour meter. For this purpose, the base plate 2 is provided with contact blades 10 which extend through the base plate but are insulated therefrom. These contact blades are connected to the voltage and current windings through suitable conductors 11. The casing also includes a cover 12 having a light-permeable face portion 12a and a wall portion 12b extending between the face portion and the base member or plate 2. Conveniently the cover may be of glass. This cover is detachably associated with the base plate 2. It will be understood that the watthour meter 1 is designed to be mounted on a watthour meter socket with the contact blades 10 engaging contact jaws positioned within the socket (not shown). The cover may be attached to the base plate by means of a metal rim 12c having inturned flanges or cams 12d for engaging lugs 2a carried by the base plate 2. A conventional sealing ring 2b is indicated for sealing the casing to a socket. If desired, a resilient gasket 2c of felt or other suitable material may be interposed between the base plate 2 and the cover 12. A suitable construction for the casing and the socket of a detachable watthour meter is shown in the Bradshaw et al. Patent 1,969,499, which is assigned to the Westinghouse Electric & Manufacturing Company.

In order to measure the maximum demand of electrical energy supplied through the watthour meter 1, or of any other desired quantity, a time lagged maximum demand measuring device 13 is associated with the watthour meter 1 within the same cover 12. This device may be mounted on the lower face of a shelf 14 which is attached in any suitable manner, as by screws 14a, to a face plate 15 and to the watthour meter 1. Preferably the face plate 15 is provided with an opening 15a through which the integrating register 9 is exposed and through which the register may be moved readily for attachment, servicing or replacement.

The exact construction of the maximum demand measuring device 13 may vary appreciably. One form of a thermal maximum demand device is shown in the Smith Patent No. 1,417,695. In the specific embodiment illustrated in Figs. 1, 2 and 3, the device includes two bimetallic spiral springs 16 and 17 which have their inner ends attached to hubs 18 and 19. These hubs are fixed to a common shaft 20. It will be understood that a bimetallic spring is formed of two dissimilar metals or alloys having different coefficients of thermal expansion. Consequently, when each of the bimetallic springs is heated, its inner end tends to rotate relative to the outer end. The outer ends of the bimetallic springs 16 and 17 are fixed in permanent positions by means which will be described below.

For controlling the temperature of the bimetallic springs 16 and 17, four heaters 21, 22, 23 and 24 are associated therewith. Each of the bimetallic springs is heated by one pair of heaters, as clearly illustrated in Fig. 1.

The bimetallic springs 16 and 17 are so mounted that when heated they tend to urge the shaft 20 in opposite directions of rotation. Consequently, variations in temperature which affect both springs equally have no appreciable effect on the rotation of the shaft 20 and the pusher arm 20a associated with the shaft. This means that ambient temperature variations have little effect on the accuracy of the maximum demand measuring device.

Rotation of the shaft 20 is determined by the difference in temperatures of the bimetallic springs 16 and 17. By proper energization of the heaters, the rotation of the shaft and the pusher arm may be made dependent on a desired variable quantity such as energy flowing through the watthour meter 1. Connections suitable for this purpose are illustrated in Fig. 3.

Referring to Fig. 3, the voltage winding 5 and current windings 6 of the watthour meter 1 are shown associated with a circuit 25 for the purpose of measuring energy flowing therethrough. The heaters 21, 22, 23 and 24 are connected in a series circuit for energization by a current $I_e$ which varies in accordance with the voltage of the circuit 25. Although the heaters could be connected directly to the circuit or through a separate transformer, an appreciable saving in space and cost may be effected by energizing the heater from the voltage winding 5 of the watthour meter 1. For this purpose, the voltage pole of the watthour meter 1 is provided with an auxiliary secondary winding 26. This auxiliary winding 26 constitutes the secondary winding of a transformer in which the voltage winding 5 of the watthour meter is the primary winding. Consequently, the output of the secondary winding 26 may be represented by a current $I_e$ which varies in accordance with the voltage of the circuit 25.

Each of the heaters 21, 22, 23 and 24 also is heated by a current $I_1$ which varies in accordance with the current $I$ of the circuit 25. This current may be obtained by connecting one terminal of the current winding 6 to a centrally disposed tap 27 on the secondary winding 26. By inspection of Fig. 3, it will be noted that the heaters 21 and 22 and the heaters 23 and 24 form two arms of a parallel circuit which is connected in series with the current winding 6 of the watthour meter for energization by the current $I$ flowing in the circuit 25. Consequently, the current $I_1$ in each heater is equal to one-half of the current $I$ flowing in the circuit 25. Instantaneous directions of flow for the currents $I_e$ and $I_1$ are indicated by arrows in Fig. 3. It will be observed that the directions of flow are such that the currents $I_e$ and $I_1$ add vectorially in the heaters 23 and 24 and subtract vectorially in the heaters 21 and 22. Consequently, when current flows in the circuit 25, a larger resultant current flows in the heaters 23 and 24 than in the heaters 21 and 22. With a circuit as illustrated in Fig. 3, the rotation of the shaft 20 of the maximum demand measuring device 13 is dependent upon energy flowing in the circuit 25, as well understood in the art. Other connections for the heaters are shown in the aforesaid Smith patent.

The operating parts of the maximum demand measuring device 13 are enclosed in suitable housing 28 which includes a base portion 29. This base portion is provided with two chambers 30 and 31 for receiving respectively, the bimetallic springs 16 and 17. In addition, the base portion 29 includes four slots 32, 33, 34 and 35 for receiving respectively, the heaters 21, 22, 23 and 24. Although separate housing may be employed for each of the bimetallic springs, preferably the base portion is a unitary structure wherein the chambers 30 and 31 are connected by one or more webs 36 of restricted cross-section. The restriction of the cross-section is for the purpose of restricting the transmission of heat between two chambers. As a further guard against the transmission of heat between the chambers, the chambers are separated by a substantial air space 37.

The base portion 29 also has a slot 38a for receiving the ring flange 38 of a bearing 39. This bearing is for the purpose of receiving one end of the shaft 20. The remaining end of the shaft 20 is positioned in a bearing 40 carried by the face plate 15.

In order to position accurately the outer ends of the bimetallic springs 16 and 17, the ends are attached, respectively, to split rings 41 and 42. These split rings may be of heat conductive material such as metal or of insulating material, such as a phenol condensation product, depending upon the particular characteristic desired. In the specific embodiment illustrated in Figs. 1, 2 and 3, it may be assumed that the split rings 41 and 42 are of an insulating material, such as a phenol formaldehyde condensation product. The attachment of the ends to the split rings may be in any suitable manner as by rivets.

To assist in positioning the split rings, the base portion 29 is provided with one or more ribs for each of the split rings. For example, ribs 43 are provided for the split ring 41 and ribs 44 are provided for the split ring 42. When each spring and its associated split ring are inserted in a chamber, the ribs 43 or 44 are received between the ends of the split ring to position the ring within the chamber. Since the ring is somewhat resilient, the ends thereof may be spaced apart by a distance normally slightly less than the corresponding dimension of the ribs. This serves to eliminate play between the ribs and ring. By inspection of Fig. 1, it will be noted that the split rings 41 and 42 serve to space the bimetallic springs 16 and 17 slightly from the walls of the chambers provided in the housing 28. If necessary additional ribs or abutments may be provided for engaging and positioning the split rings.

Each of the chambers is provided with a cap 46 and 47 for completing the enclosure of each bimetallic spring. Although these caps may be associated in a unitary structure similar to the base portion 29, preferably they are completely separated in order to increase the heat insulation between the chambers. The caps 46 and 47 are provided with chambers and slots for receiving the bimetallic springs, split rings, bearing and heaters which are similar to the chambers and slots in the base portion 29. It will be noted that each of the caps includes ribs 43a and 44a which engage the outer surface of the associated split rings to complete the positioning of the rings in their respective chambers. Because of this construction, an air space is left substantially around each split ring.

The housing 28 may be constructed of various materials. Preferably the material selected is a heat and electrical insulating material, such as a phenol formaldehyde condensation product. Because of the accessible construction of the base portion 29 and the caps 46 and 47, these parts may be formed readily by a molding or casting operation. To facilitate such molding or casting, the walls of the various chambers and slots may be tapered slightly.

Except for the inversion of the maximum demand measuring device 13 from a position above the watthour meter 1 to a position below the watthour meter 1, the structure thus far described in detail with reference to Fig. 1 is shown in the copending application of H. P. Vassar, Serial No. 394,260, filed May 20, 1941, which has issued as Patent No. 2,323,738. For a further description of this device, reference may be made to the Vassar application.

In order to show the deflection of the shaft 20, a suitable indicating device, such as an indicating pointer or pen arm, may be associated with the shaft. As shown in the drawing, an indicating pointer 53 may be attached to the shaft 20 in any suitable manner. For example, the indicating pointer 53 may have a hub 53a which is pressed and fixed firmly on the shaft 20. The indicating pointer 53 rotates with the shaft 20 to indicate the rotation thereof, and consequently, the resultant deflection of the bimetallic springs 16 and 17. A scale 60 may be provided on the face plate 15 for coaction with the pointer 53. This scale may be calibrated to represent the quantity measured by the maximum demand pointer 53, which in this case is energy demand.

For restricting rotation of the shaft 20, deflection of the bimetallic springs 16 and 17, and rotation of the pointer 53 to a predetermined direction, a unidirectional device 70 is associated with the maximum demand measuring device 13. This unidirectional device may take the form of a ratchet wheel 71 which is secured to the shaft 20. In order to permit the placement of the unidirectional device 70 adjacent the base plate 2, the shaft 20 may be extended. If necessary, an auxiliary bearing 72 may be provided on the base plate 2 for receiving one end of the shaft 20.

Rotation of the ratchet wheel 71 is restricted to a predetermined direction which is clockwise, as viewed in Fig. 2, by means of a pawl assembly 73 which is mounted for rotation on a stub shaft 74 secured to the base plate 2. The pawl assembly may be actuated into engagement with the ratchet wheel 71 in any suitable way, as by means of a biasing spring. In the specific form illustrated in Fig. 2, the pawl assembly includes a pawl arm 75 for engaging the teeth of the ratchet wheel 71 and an actuating arm 76. The pawl arm 75 and the actuating arm 76 are urged by gravity in a clockwise direction, as viewed in Fig. 2, to bring the pawl arm 75 into engagement with the ratchet wheel 71.

It is believed that the operation of the device thus far described is apparent from the foregoing discussion. When the maximum demand measuring device 13 is energized as shown in Fig. 3, the maximum demand pointer 53 is carried over the scale 60 to indicate the maximum energy demand of the circuit 25 for the demand interval. If after an initial movement of the maximum demand pointer 53, succeeding maximum demands are all smaller than that represented by the initial movement, the pointer 53, the shaft 20, and the bimetallic springs 16 and 17, remain substantially at rest. This is for the reason that the ratchet wheel 71, in cooperation with the pawl 75, prevents a return movement of the pointer, shaft and springs.

The only effect of such a change in the maximum demand of the quantity being measured is to change the resultant bias exerted by the bimetallic springs 16 and 17 on the shaft 20.

Should the maximum demand of the circuit 25 increase following the initial movement of the pointer 53, the construction of the pawl arm 75 and the ratchet wheel 71 permits rotation of the shaft 20 under the influence of the bimetallic springs 16 and 17 to carry the maximum demand pointer 53 clockwise, as viewed in Fig. 2, to indicate a corresponding larger quantity on the scale 60. Therefore, the maximum demand pointer 53, the shaft 20, and the bimetallic springs 16 and 17 move only when the maximum demand of the circuit 25 exceeds that indicated by the maximum demand pointer 53. The maximum demand at the end of a billing period may be noted by an inspection of the position of the maximum demand pointer 53 relative to the scale 60.

If the maximum demand of the circuit 25 at the end of a billing period is less than that indicated by the position of the maximum demand pointer 53, it is desirable to reset the maximum demand pointer 53 to the lower value for further operation of the maximum demand measuring device during a succeeding billing period. This resetting may be effected by moving the pawl arm 75 clear of the teeth of the ratchet wheel 71. This permits the bimetallic springs 16 and 17 to move the shaft 20 and the pointer 53 in a counterclockwise direction, as viewed in Fig. 2, to the lower value corresponding to the maximum demand of the circuit 25 then existing. The return movement of the shaft 20 and the maximum demand pointer 53 takes place with reasonable promptness for the reason that the bimetallic springs 16 and 17 exert a bias on the shaft 20 in the direction of the lower value prior to the resetting operation.

Movement of the pawl arm 75 preferably is effected externally of the enclosure for the watthour meter 1 and the maximum demand measuring device 13. For this purpose, the actuating arm 76 may be provided with a depending pin 77 attached thereto in any suitable manner. The pin 77 has an end disposed above a disc 78 which is carried by a control member or rod 79. As shown in Figs. 1 and 2, the rod 79 is positioned substantially between the cover 12 and the base member 2. Conveniently, the cover 12 may be provided with a groove 80 for receiving the rod 79. The external end of the rod 79 may carry a knob 79a which may be engaged for reciprocating the rod in an upward direction, as viewed in Figs. 1 and 2.

A suitable seal may be provided for the rod 79 to prevent actuation thereof by an unauthorized person. To this end, the rod 79 may be provided with a hole 81 through which a conventional sealing wire (not shown) may be threaded.

The installation of the rod 79 and associated parts will be apparent from the drawing, taken with the foregoing description. With the cover 12 displaced from the base member 2, the rod 79 may be inserted through an opening 82 provided in the rim 12c into the groove 80. At the time of insertion, the rod 79 may carry the disc 78. The knob 79a then may be applied to the external end of the rod 79 in any suitable manner, as by providing the rod 79 and knob 80 with cooperating screw threads (not shown).

With the rod assembly in position, the base member 2 carrying the watthour meter 1, the maximum demand measuring device 13, and the pawl assembly 73, may be moved into the position illustrated in Fig. 1. In this position, the pin 77 is operatively disposed above the disc 78. To provide clearance for the rod 79, the sealing ring 2b may be provided with a notch 83 within which the rod 79 is positioned when the sealing ring is in sealing position.

The operation of the resetting mechanism thus far described now may be set forth. Over a billing period, the maximum demand measuring device 13 actuates the maximum demand pointer 53 to a position corresponding to the maximum demand for a demand interval occurring during the billing period. The maximum demand pointer, together with the shaft 20 and the bimetallic springs 16 and 17, is maintained in the maximum demand position by engagement of the pawl arm 75 with the ratchet wheel 71.

At the end of a billing period, a meter reader first notes the reading of the pointer 53 on the scale 60. The meter reader next removes the sealing wire from the hole 81 and raises the rod 79 by engaging the knob 79a. Movement of the rod 79 carries the disc 78 into engagement with the pin 77 and rotates the pawl assembly 73 counterclockwise, as viewed in Fig. 2. Such movement of the pawl assembly carries the pawl arm 75 out of engagement with the ratchet wheel 71 and permits the return of the maximum demand pointer 53 in a resetting direction. To complete the resetting operation, the meter reader returns the rod 79 to the position illustrated in Fig. 1 and reinserts a sealing wire in the hole 81. The measuring device then is conditioned for operation during the next billing period.

Although the invention has been described with reference to certain specific embodiments thereof, numerous modifications are possible. Therefore, the invention is to be restricted only by the appended claims.

I claim as my invention:

1. In a thermal maximum demand measuring device for measuring the maximum demand of a variable electrical quantity, measuring means including a thermomotive actuating unit, said thermomotive unit including bimetallic spring means designed to deflect normally in accordance with the temperature thereof, means for heating said bimetallic spring means in accordance with an electrical quantity to be measured, and unidirectional means associated with said thermomotive unit for permitting deflection of said bimetallic spring means in a predetermined direction but preventing deflection of said bimetallic spring means in the reverse direction, whereby said bimetallic spring means retains its extreme deflection in said predetermined direction, an enclosure for said measuring means including separable base and cover members, and means operable to release said bimetallic spring means for movement in said reverse direction, said bimetallic spring means operating only by its resiliency to return promptly in said reverse direction to a new deflection if the value of the quantity being measured is less than the value represented by the deflection of said bimetallic spring means immediately prior to a releasing operation thereof, said releasing means having an operating member extending exteriorly of said enclosure substantially at the junction between said cover and base members.

2. In a thermal maximum demand measuring device for measuring the maximum demand of a variable electrical quantity, actuating means including a thermomotive unit, said thermomotive unit including bimetallic spring means designed to deflect normally in accordance with the temperature thereof, a shaft associated with said bimetallic spring means, means mounting said shaft for rotation in accordance with deflection of said bimetallic spring means, means associated with said shaft on a first side of said bimetallic spring means for indicating a quantity dependent on the rotation of said shaft, electrical heating means for heating said bimetallic spring means in accordance with an electrical quantity to be measured, unidirectional means associated with said shaft on a second side of said bimetallic spring means for permitting deflection of said bimetallic spring means in a predetermined direction but preventing deflection of said bimetallic spring means in the reverse direction, whereby said bimetallic spring means retains its extreme deflection in said predetermined direction, an enclosure for said bimetallic spring means, said enclosure including a cup-shaped member having a light-permeable face adjacent said indicating means and having a wall portion extending towards said unidirectional means, and resetting means adjacent the open end of said member and operable externally of said enclosure for permitting deflection of said bimetallic spring means in said reverse direction.

3. In a measuring device for measuring a variable electrical quantity; an enclosure comprising a base member, and a cup-shaped member having a light permeable face portion spaced from said base member, and having a wall portion extending from said face portion towards said base member; a demand measuring structure positioned in said enclosure, said demand measuring structure including a shaft extending for a substantial distance from a point adjacent said face portion towards said base member, actuating means for rotating said shaft in accordance with the demand of the quantity to be measured, means extending adjacent said face portion for indicating the rotation of said shaft, and unidirectional means positioned between said actuating means and said base member for restricting rotation of said shaft to a predetermined direction; resetting means operable for releasing said unidirectional means to permit a resetting operation of said shaft, and externally accessible means extending from said enclosure adjacent the junction between said cup-shaped member and said base member for operating said resetting means.

4. In a measuring device for measuring a variable quantity, a motive actuating unit responsive to said variable quantity, said actuating unit comprising a resilient spiral member having a first portion movable relative to a spaced second portion of said spiral member in accordance with a function of said variable quantity, said first portion being biased towards a predetermined position with respect to said second portion, unidirectional means associated with said actuating unit for permitting deflection of said first portion in a predetermined direction away from said predetermined position but preventing deflection of said first portion in the reverse direction, whereby the first portion of said spiral member retains its extreme deflection in said predetermined direction, a common enclosure for said actuating unit and said unidirectional means, said enclosure comprising a plurality of parts having adjacent faces, and means operable externally of said enclosure for releasing said spiral member to permit the resiliency of said spiral member to return said first portion in said reverse direction from a deflected position towards said predetermined position if the value of the quantity being measured permits the return of said first portion in said reverse direction, said last-named means including an operating member positioned substantially between said parts and extending through said enclosure.

WILLIAM M. BRADSHAW.